United States Patent
Demetris

(10) Patent No.: US 7,210,264 B1
(45) Date of Patent: May 1, 2007

(54) COMBINED TELESCOPIC WADING STAFF AND FISHING POLE

(76) Inventor: Stanley P. Demetris, 580 Perlee Ave., Raritan, NJ (US) 08869

( * ) Notice: Subject to any disclaimer, the term of this patent is extended or adjusted under 35 U.S.C. 154(b) by 0 days.

(21) Appl. No.: 11/251,419

(22) Filed: Oct. 14, 2005

(51) Int. Cl.
*A01K 87/08* (2006.01)
*A01K 87/00* (2006.01)

(52) U.S. Cl. ............................ 43/23; 43/25; 43/18.1 CT

(58) Field of Classification Search .................. 43/23, 43/25, 18.1 R, 18.1 CT; 135/65, 66, 75; 248/532
See application file for complete search history.

(56) References Cited

U.S. PATENT DOCUMENTS

| | | | | |
|---|---|---|---|---|
| 10,795 A * | 4/1854 | De Saxe | ................... | 43/18.1 R |
| 122,218 A * | 12/1871 | Bogert | ...................... | 135/66 |
| 341,715 A * | 5/1886 | Allen | ......................... | 135/66 |
| 375,485 A * | 12/1887 | Godward | ..................... | 135/66 |
| 457,160 A * | 8/1891 | Killenberger | ................ | 135/66 |
| 459,081 A * | 9/1891 | Felker | ......................... | 135/66 |
| 461,106 A * | 10/1891 | Oberly | ........................ | 43/18.1 R |
| 465,254 A * | 12/1891 | Felker | ......................... | 43/18.1 R |
| 475,852 A * | 5/1892 | Edgerly | ...................... | 43/18.1 R |
| 706,225 A * | 8/1902 | Ekelund | ..................... | 43/18.1 R |
| 849,481 A * | 4/1907 | Lobit | ......................... | 43/18.1 R |
| 911,119 A * | 2/1909 | Farr | ........................... | 43/18.1 R |
| 993,121 A * | 5/1911 | Stone et al. | ............. | 43/18.1 R |
| 1,001,326 A * | 8/1911 | Upton | ........................ | 43/23 |
| 1,020,044 A * | 3/1912 | McGuire | ................... | 43/18.1 R |
| 1,109,513 A * | 9/1914 | Cooke | ........................ | 135/75 |
| 1,113,847 A * | 10/1914 | Turner | ....................... | 43/18.1 R |
| 1,174,526 A * | 3/1916 | Stoddart | ................... | 43/18.1 R |
| 1,255,269 A * | 2/1918 | Zinkiewiez | .............. | 43/18.1 R |
| 1,271,073 A * | 7/1918 | Patten | ........................ | 43/23 |
| 1,276,780 A * | 8/1918 | Lucas | ........................ | 43/18.1 R |
| 1,283,015 A * | 10/1918 | Yung | ........................ | 43/18.1 R |
| 1,310,452 A * | 7/1919 | Sliwinski | ................ | 43/18.1 CT |
| 1,318,085 A * | 10/1919 | Kee | ............................. | 43/23 |
| 1,324,554 A * | 12/1919 | Kozlowski | ............. | 43/18.1 CT |
| 1,336,088 A * | 4/1920 | Poremba | ................. | 43/18.1 CT |
| 1,337,378 A * | 4/1920 | Winskas | ................. | 43/18.1 CT |
| 1,406,268 A * | 2/1922 | Madej | ..................... | 43/18.1 CT |
| 1,442,813 A * | 1/1923 | Lobit | ...................... | 43/18.1 CT |
| 1,456,304 A * | 5/1923 | Fritschka | ..................... | 135/66 |
| 1,518,205 A * | 12/1924 | Kountz | ........................ | 43/23 |
| 1,520,113 A * | 12/1924 | Bloom | .......................... | 43/23 |
| 1,577,612 A * | 3/1926 | Dees | .......................... | 43/21.2 |
| 1,839,751 A * | 1/1932 | Fenton | ......................... | 43/23 |
| 1,851,370 A * | 3/1932 | Munger | ................... | 43/18.1 R |
| 1,914,500 A * | 6/1933 | Groschup | .............. | 43/18.1 CT |
| 1,972,518 A * | 9/1934 | Grandjean | ............. | 43/18.1 CT |

(Continued)

FOREIGN PATENT DOCUMENTS

GB 2164551 A * 3/1986

(Continued)

*Primary Examiner*—Darren W. Ark
(74) *Attorney, Agent, or Firm*—Kenneth P. Glynn

(57) ABSTRACT

A combination telescopic wading staff and fishing pole device includes a pole with a hollow storage area and a staff that is retractable and extensible. The telescopic wading staff has a plurality of interconnected elongated segments that are slideably, telescopically moveable relative to one another with a first, fully compacted configuration (retracted), and a second, fully extended configuration. The staff includes a locking mechanism for at least locking the plurality of interconnected elongated segments when it is fully extended.

12 Claims, 3 Drawing Sheets

U.S. PATENT DOCUMENTS

| | | | |
|---|---|---|---|
| 2,003,893 A * | 6/1935 | La Pan | 43/25 |
| 2,010,627 A * | 8/1935 | Dileo | 43/23 |
| 2,088,132 A * | 7/1937 | Domecq | 43/23 |
| 2,241,183 A * | 5/1941 | Ceder | 43/23 |
| 2,275,330 A * | 3/1942 | Tveten | 135/65 |
| 2,438,388 A * | 3/1948 | Dolk | 43/21.2 |
| 2,443,946 A * | 6/1948 | Bozorth, Jr. | 43/25 |
| 2,546,079 A * | 3/1951 | Seviola | 43/18.1 CT |
| 2,597,738 A * | 5/1952 | Koos | 43/18.1 CT |
| 2,665,866 A * | 1/1954 | Goldinger | 43/21.2 |
| 2,678,817 A * | 5/1954 | Mitton | 43/23 |
| 2,724,203 A * | 11/1955 | Neubarth | 43/18.1 R |
| 2,750,184 A * | 6/1956 | Warndahl | 43/23 |
| 2,808,676 A * | 10/1957 | Major | 43/23 |
| 2,830,399 A * | 4/1958 | Davis | 43/23 |
| 2,834,139 A * | 5/1958 | Needham | 43/23 |
| 2,839,865 A * | 6/1958 | Lubanski | 43/18.1 CT |
| 2,914,881 A * | 12/1959 | Williams | 43/23 |
| 2,923,063 A * | 2/1960 | Hansen | 135/66 |
| 2,997,042 A * | 8/1961 | Mitchell | 43/23 |
| 3,150,460 A * | 9/1964 | Dees | 43/18.1 CT |
| 3,318,560 A * | 5/1967 | Garrette, Jr. et al. | 248/545 |
| 3,445,952 A * | 5/1969 | Ferman | 43/23 |
| 3,447,254 A * | 6/1969 | Sobel et al. | 43/23 |
| 3,468,052 A * | 9/1969 | Hardesty et al. | 43/23 |
| 3,827,173 A * | 8/1974 | Barnes | 43/23 |
| 3,975,855 A * | 8/1976 | McKeown | 43/23 |
| 4,004,539 A * | 1/1977 | Wesson | 43/5 |
| 4,048,743 A * | 9/1977 | Lapinski | 43/18.1 R |
| 4,086,718 A * | 5/1978 | Swanson et al. | 43/17.2 |
| 4,131,122 A * | 12/1978 | Brooks | 135/76 |
| 4,209,931 A * | 7/1980 | Vance | 43/23 |
| 4,261,128 A * | 4/1981 | Dobbins | 43/23 |
| 4,265,046 A * | 5/1981 | Keith | 43/25 |
| 4,443,963 A * | 4/1984 | Braaten | 43/23 |
| 4,467,548 A * | 8/1984 | Tabor | 43/23 |
| 4,498,257 A * | 2/1985 | Jekel | 43/23 |
| 4,619,066 A * | 10/1986 | Kirkland et al. | 43/25 |
| 4,637,157 A * | 1/1987 | Collins | 43/23 |
| 4,644,680 A * | 2/1987 | Dawson | 43/18.1 R |
| 4,646,461 A * | 3/1987 | McLeod | 43/23 |
| 4,658,534 A * | 4/1987 | McLean | 43/21.2 |
| 4,738,046 A * | 4/1988 | Fraylick et al. | 43/18.1 R |
| 4,748,762 A * | 6/1988 | Campbell | 43/21.2 |
| 4,793,646 A * | 12/1988 | Michaud, Jr. | 294/19.1 |
| 4,858,365 A * | 8/1989 | Struntz | 43/23 |
| 4,860,485 A * | 8/1989 | Rhoton et al. | 43/18.1 CT |
| 4,864,763 A * | 9/1989 | Peikin | 43/18.1 R |
| 4,869,011 A * | 9/1989 | Whiting et al. | 43/23 |
| 4,995,188 A * | 2/1991 | Ewing | 43/23 |
| 5,163,242 A * | 11/1992 | Smith | 43/1 |
| 5,263,275 A * | 11/1993 | Rumbaugh | 43/23 |
| 5,522,169 A * | 6/1996 | Heller | 43/23 |
| 5,566,493 A * | 10/1996 | Minorics | 43/17.5 |
| 5,588,244 A * | 12/1996 | Akiba et al. | 43/18.1 R |
| 5,628,538 A * | 5/1997 | Ericksen | 43/4 |
| 5,647,162 A * | 7/1997 | Akiba et al. | 43/18.1 R |
| 5,690,552 A * | 11/1997 | Siddle | 463/47.7 |
| 5,950,346 A * | 9/1999 | da Rosa | 43/25 |
| 5,961,387 A * | 10/1999 | Parsons | 135/75 |
| 6,056,643 A * | 5/2000 | Wilmoth, III | 135/75 |
| 6,115,955 A * | 9/2000 | Sledge | 43/18.1 HR |
| 6,178,685 B1 * | 1/2001 | Broadway | 43/18.1 R |
| 6,189,255 B1 * | 2/2001 | Muneki et al. | 43/18.1 R |
| 6,216,998 B1 * | 4/2001 | Butrymowicz et al. | 43/21.2 |
| 6,263,892 B1 * | 7/2001 | Baker | 135/66 |
| 6,266,913 B1 * | 7/2001 | Akiba et al. | 43/18.1 R |
| 6,510,645 B2 * | 1/2003 | Oguri | 43/23 |
| 6,539,965 B1 * | 4/2003 | White, III | 135/66 |
| 6,898,891 B1 * | 5/2005 | Needham | 43/4 |
| 2002/0104560 A1* | 8/2002 | Kelley | 135/66 |
| 2003/0010369 A1* | 1/2003 | Almond | 135/65 |
| 2006/0101705 A1* | 5/2006 | Sanders | 43/25 |

FOREIGN PATENT DOCUMENTS

| | | | |
|---|---|---|---|
| JP | 9-114 A | * | 1/1997 |
| JP | 2001-45924 A | * | 2/2001 |

* cited by examiner

COMBINED TELESCOPIC WADING STAFF AND FISHING POLE

BACKGROUND OF THE INVENTION

1. Field of the Invention

The present invention relates to solving problems for fishermen who fish from a standing or wading position and have need for one of the many uses of wading staffs, but are otherwise discouraged from using wading staffs due to the difficulty of stowing the staff while fishing. More specifically, the invention offers a fishing rod with a hollow handle end for storage of a compact wading staff wherein the wading staff is a telescopic retractable/extensible wading staff.

2. Information Disclosure Statement

The following prior art is representative of the state of the art in the field of fishing rods and wading staffs:

U.S. Pat. No. 6,510,645 B2 describes a fishing rod that includes a hollow tubular body having first and second open end portions. The fishing rod further comprises a first member provided at the first open end portion of the tubular body and a second member provided at the second open end portion of the tubular body. A rod blank extends through the first member and the tubular body and terminates at a terminal portion which is disposed in the second member. The rod blank is fixed to the first member and elastically suspended by the second member. An air gap is formed around the rod blank in the tubular body so that a vibration is generated on the rod blank by a strike and transmitted along the rod blank to pass through the first member and reach the terminal portion of the rod blank. The vibration is then reflected from the terminal portion of the rod blank and transmitted along the rod blank reversely toward the first member to be amplified by a resonance. The first member receives the vibration amplified by the resonance.

U.S. Pat. No. 6,189,255 B1 describes a hollow telescopic fishing rod that has a fishing rod body which includes a plurality of fishing rod body sections made from fiber-reinforced resin. The fishing rod body has an inner surface, an internal path for a fishing line and line-holding protrusions made from the fiber-reinforced resin, preferably by means of monobloc forming together with said fishing rod body sections. The line-holding protrusions are formed on the inner surface in a spiral, and the line holding protrusions have a cross-sectional shape which is a trapezoid whose upside corners are arc-shaped.

U.S. Pat. No. 5,628,538 describes an extensible wading staff that includes an elongate shaft with first and second ends, a gripping area, a retractable hook near the first end, and a foot structure such as a rubber cap on the sealed end. A fisherman who is in water, especially moving water, may use the wading staff to maintain his balance while he is flyfishing. In addition, a fisherman may use the staff to help him retrieve snagged fishing devices such as flies, lures, lines and hooks from overhanging tree branches or under water obstacles.

U.S. Pat. No. 5,566,493 describes a retractable, universal lamp for a fishing pole that includes a hollow handle portion and a hollow rod portion. The hallow handle portion further having an externally exposed segment. A self-contained lamp unit is positioned within the hollow handle such that a flexible, elongated connector and bulb can be universally positioned by the user for aid in night fishing. Further more, a plurality of light conductive eyes are disposed on an external side of the rod portion. The eyes are illuminated by light transmitted from the bulb via a bundle of optical fibers.

U.S. Pat. No. 4,793,646 describes an adjustable interlocking telescopic handle and arm assembly that includes at least two elongated, telescopically engaged tube members which incorporate therein a spring biased, dual locking pin structure in combination with tube aligning and centralizing zones, a unique, adjustable handle and arm assembly is achieved which is capable of being easily moved into a plurality of alternate positions and securely engaged in each position, with unwanted dislodgment or lateral wobbling or movement being completely eliminated. In the preferred embodiment, the elongated telescopically engaged tube members are constructed with cooperating enlarged diameter zones and reduced diameter zones to prevent the unwanted disengagement of the tube members. In addition a plurality of alternate operative end units can be quickly and easily mounted to said elongated handle and arm assembly, with one of said end units comprising a unique mooring clasp and book hook construction.

U.S. Pat. No. 4,086,718 describes a telescoping, pole-type lure retriever that has a snare portion that wraps around a fishing line and is guided thereon for removing a fishing lure that is snagged on an underwater obstruction or weeds. An elongated pole has a number of telescoping sections that may be extended to a convenient length to disengage the lure. Each telescoping section may be locked in position by turning a locking nut that compresses a locking ring in a cammed fashion to grip a smaller diameter pole section. The snake portion has a knurled shank seated in locking engagement with a sleeve member and with the sleeve fitted in the end of one pole section.

U.S. Pat. No. 4,004,539 describes a boat hook that is provided with a series of attachments engageable with a coupling device on the prod end. The coupling preferably includes a threaded section, and is set back from the point of the prod for the dual purpose of protecting the threads, and for utilizing the point as the means of assuring positive coaxial alignment of the coupling. The attachments provide a variety of areas of utility, and the preferred form of the invention has a telescoping handle capable of being locked in a plurality of degrees of extension appropriate to the particular attachments that may be coupled to the basic device. The original utility of the boat hook is not impaired by the provision for the attachments. One of the attachments is a hoop with a provision for temporarily retaining a loop in a mooring line.

U.S. Pat. No. 3,975,855 describes a combination fishing rod that has a plurality of hollow, tubular rod elements telescopically secured into a hollow handle and collapsed substantially completely into the handle for storing. A removable handle an reel seat member is frictionally held onto the handle section of the telescopic rod elements. The removable handle and reel seat are secured to the rod elements in one orientation to form a spinning rod and in another orientation to form a fly-casting rod. The removable handle and reel seat element is held to the fishing rod by sliding frictional engagement.

U.S. Pat. No. 3,150,460 illustrates a fishing device that has a handle in at least two sections, the first handle section being hollow and having an internal diameter sufficiently great to receive the second handle section in telescoped relation therein, a sleeve open at both ends disposed in one end of the first handle section, the opening at each end of the sleeve being substantially smaller in diameter than the internal diameter of said one end of the first handle section, a member projecting from one end of the second handle section and being of a size to fit in either end of the sleeve and of a diameter substantially smaller than the diameter of said one end of the second handle section, and means engaging between said sleeve and said member releasably to retain said member in said sleeve both when the handle sections are assembled in end-to-end relation and when the handle sections are telescoped with said second handle section disposed within said first handle section.

Notwithstanding the prior art, the present invention is neither taught nor rendered obvious thereby.

SUMMARY OF THE INVENTION

The present invention relates to a combination telescopic wading staff and fishing pole, that includes a pole with a hollow storage area and a staff that is retractable and extensible. The fishing pole has a proximal end and a distal end. The proximal end includes a handle, is at least partially hollow, and is adapted to receive a telescopic wading staff. The distal end has at least one eyelet for guiding a fishing line therethrough, and other typical fishing components, such as a reel, line, lock, etc, may be on he pole on added to the pole, as the manufacturers provide poles both with and without these features, which are not pertinent to the functionality or purpose of the present invention.

The telescopic wading staff has a plurality of interconnected elongated segments that are slideably, telescopically moveable relative to one another with a first, fully compacted configuration (retracted), and a second, fully extended configuration. The staff includes locking means for at least locking the plurality of interconnected elongated segments in its second configuration, i.e., when it is fully extended.

In some present invention preferred embodiments, the fishing pole proximal end includes a cap. This cap may be selected from the group consisting of a spring cap, a hinge cap, a snap cap, a force fit cap and a screw cap, but any other functional cap could be used as well. In other embodiments, the pole proximal end has no cap, and an end of the wading staff, when inserted into the hollow area of the pole, may function as a cap.

In some present invention preferred embodiments, the telescopic wading staff plurality of interconnected elongated segments includes at least two segments, while in other preferred embodiments, it includes at least three segments. While four or more segments may be used, a three segment staff provides the optimum length with the least joints (interconnecting areas).

In some present invention preferred embodiments, the telescopic wading staff includes a handle. The telescopic wading staff may be made of any functional material or combination of materials, and is preferably made of materials that include at least one material selected from the group consisting of carbon fiber, fiberglass, plastic, metal and natural material. The natural materials include hardwoods and bamboos, and could include exotic materials such as ivory handles.

The telescopic wading staff locking means is typically used to lock the staff only in its extended position, and is not necessary for locking in the compacted position. In fact, locking in the compacted position would slow down extension of the staff and users prefer to drop open or otherwise quickly extend the telescoping segments. In some instances, the locking mechanism may have fixed locations where they lock, while others, such as a twist threaded locking ring, may permit length adjustments and choices to the user. In some present invention preferred embodiments, the locking means is selected from the group consisting of spring-loaded pin and orifice, spring-loaded ball and orifice, threaded locking ring, and force-fit interlocking ends.

In some present invention preferred embodiments, the telescopic wading staff includes an alignment mark on each of the segments to align the locking means. This enables a user to interlock the segments, first time, every time, especially beneficial where the locking means includes pop-in spring loaded components that are not readily visible before they interlock.

In some cases of the present invention, The combination telescopic wading staff and fishing pole of claim which further includes a tether line connected to at least one of the fishing pole and the telescopic wading staff.

In some embodiments of the present invention, the wading staff includes a hook. This hook may be located anywhere along the staff, but is advantageously located at or near the bottom end to provide easy and long reach for hook use. The hook may be built-in or formed as part of a staff segment, or it may be a retractable hook.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
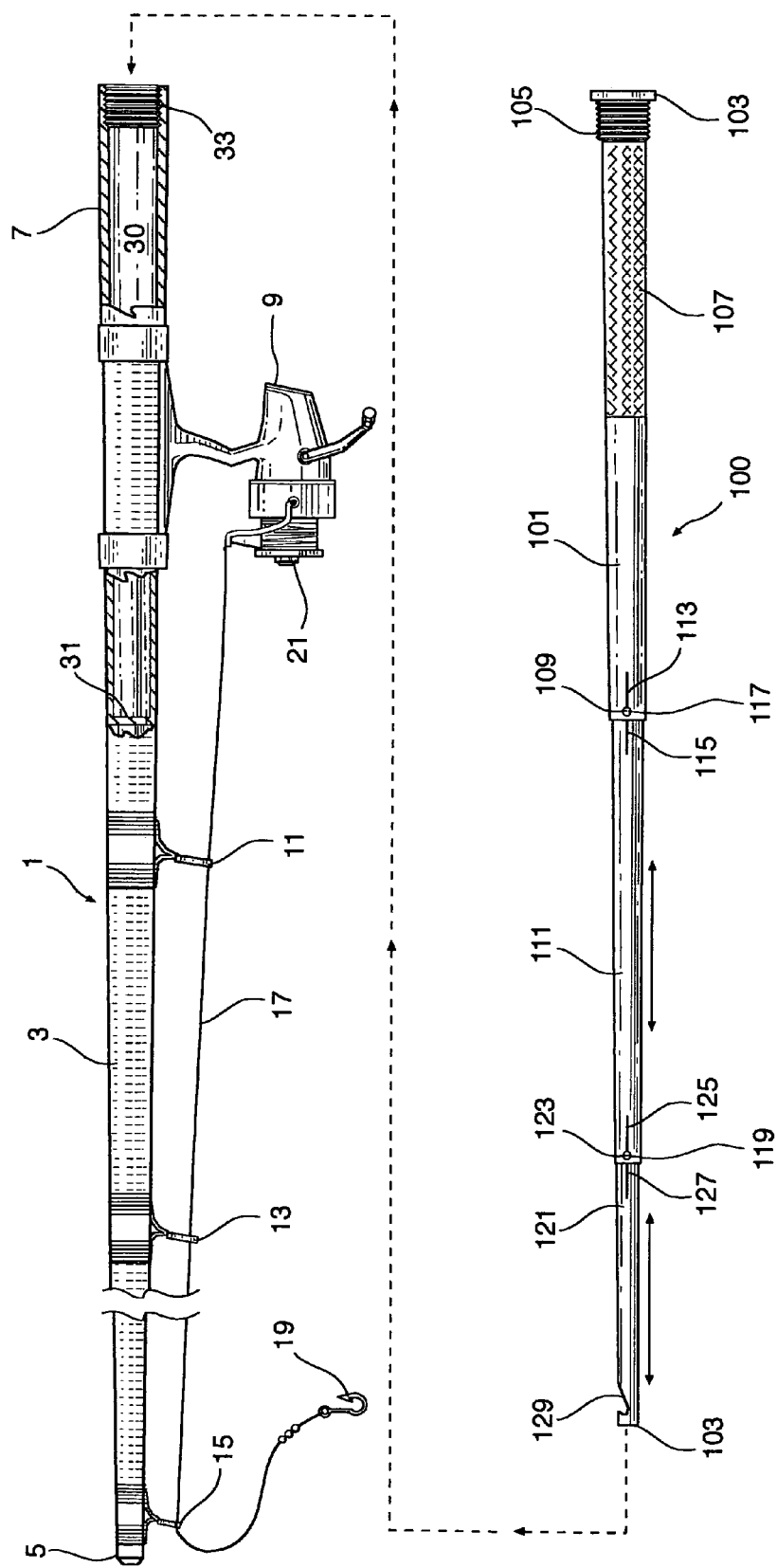
FIG. 1 shows a side, partially cut view of a present invention device that includes a fishing pole with a hollow handle and a telescopic wading staff that fits into the hollow handle.

The present invention relates to a unique solution for a problem that has created many difficulties for sports fishermen. Specifically, there are a number of problems that befall standing fishermen during their day of sport. One serious problem involves walking through streams, ponds, marshes, swamps, and lake and ocean shores where unseen perils, such as sharp rocks, foreign objects, branches, and drop-offs cause fishermen falls and/or injuries. Most of these perils can be avoided with the use of a wading staff. However, it is extremely difficult to carry a tacklebox, a rod and reel, and a wading staff. Also, how fishermen store their wading staffs when they fish creates a secondary problem. When you are standing in the middle of a river with a fishing pole and a wading staff, it is difficult. For this reason, even though wading poles are very important safety devices, they are seldom used by fishermen.

Another problem that the fishermen sometimes have, is snagging. When a line gets caught on a branch a few feet above normal reaching level, a hooked pole or wading staff is extremely useful. However, the same deterrent described above against carrying wading poles applies.

A third problem for standing or wading fishermen sometimes involves reach. A windblown hat, a loose floating object, or even a small row boat or other boat may be just out of reach and a pole with a hook would again be very beneficial.

The present invention alleviates all of the foregoing problems by providing a telescopic wading staff preferably with a hook, that is stored inside a hollow handle of a fishing pole. When fishermen are wading, the extended telescopic wading staff can be used for locating underwater perils by feel and/or as a pole hook. When fishermen are fishing, storage of the collapsed wading staff in the pole handle eliminates wading staff handling and storing problems that would otherwise prevail. Thus, the present invention devices may be used for all fresh water and salt water fishing areas where they would be beneficial, i.e., where they would solve one or more of the above identified problems.

The following examples that are set forth in the drawings show only some possibilities for present invention embodiments. After these examples have been studied in conjunction with the drawings, and further taken in conjunction with the above disclosure, many additional embodiments will be seen by the artisan.

FIG. 1 shows a present invention fishing pole 1 and present invention wading staff 100. Pole 1 has a proximal end 7 that also acts as a handle. It also has a distal end 5 and central area 3. At proximal end 7 is a hollow area 30 that extends about fifteen to twenty inches into pole 1 and terminates at stop 31. Hollow area 30 is adapted to receive present invention telescopic wading staffs 100 when staff 100 is retracted (compacted) and inserted therein. Internal threads 33 are designed to be coincidental or at least complementary with threading 105 on staff 100.

Telescopic wading staff 100 has a first segment 101, a second segment 111 and a third segment 121. At top end 103 are threads 105 and handle 107. First segment 101 has a locking mechanism for interlocking with extended segment 111 that includes an orifice 109 and a spring loaded locking ball 117. Alignment marks 113 and 115 are located respectively on first segment 101 and second segment 111 to help a user to line up orifice 109 and ball 117. Second segment 111 is likewise interconnected with third segment 121 by the same arrangement, i.e. orifice 119, ball 123, and alignment marks 125 and 127. An optional built-in hook 129 at bottom end 103 may be advantageously used to catch a snagged line or even floating runaway items.

Staff 100 may be extended or retracted as indicated by the solid arrows adjacent second segment 11 and third segment 121. When retracted, staff 100 may be inserted into hollow area 30 and rotation of cap tap end 103 will thread staff 100 into threads 33 of pole 1 for convenient, sealed storage. (Although not shown, all of the staffs have stops to prevent inadvertent separation of the segments or sections, and this is a normal feature of telescopic items.)

In the FIG. 1 embodiment of the present invention, it can be seen that pole 1 has been fitted with reel 9 and eyelets 11, 13, and 15. Fishing line 21 is wound on reel 9 and extends through the eyelets at line end 17 and other fishing components, such as weights, bobbins, flies, and hooks, e.g. hook 19.

Figure 2:
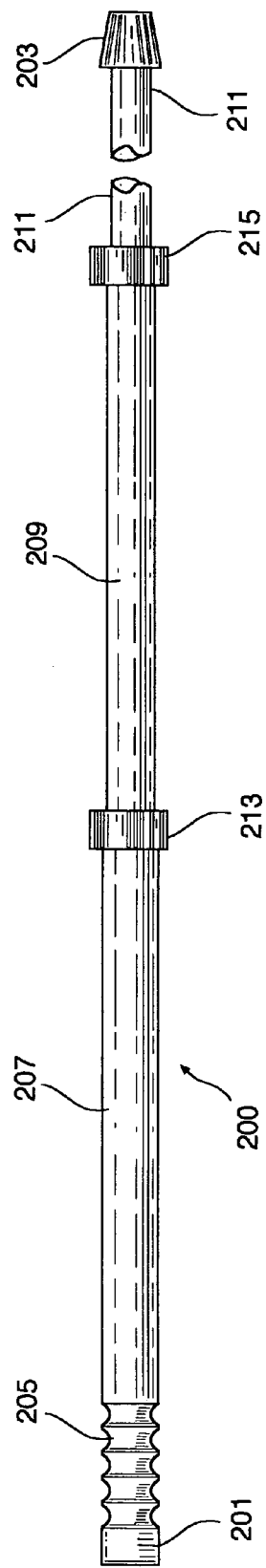
FIG. 2 illustrates a side view of an alternative embodiment telescopic wading staff of present invention devices.

Referring now to FIG. 2, there is shown a side view of another present invention component, namely wading staff 200. Staff 200 includes a top end 201 with a handle 205 and a bottom end 203. First segment 207 is slideably moveable relative to second section 209 and includes a threaded locking mechanism 213 therebetween. Locking mechanism 213 is a threaded, rotatable ring that operates in an identical fashion to the locking rings on the telescopic legs of a camera tripod. Second section 209 is similarly interconnected with third section 211 with locking mechanism 215 therebetween. This is an embodiment wherein the user may select a length and lock the sections to one another. In other words, this embodiment provides for variable lengths.

Figure 3:
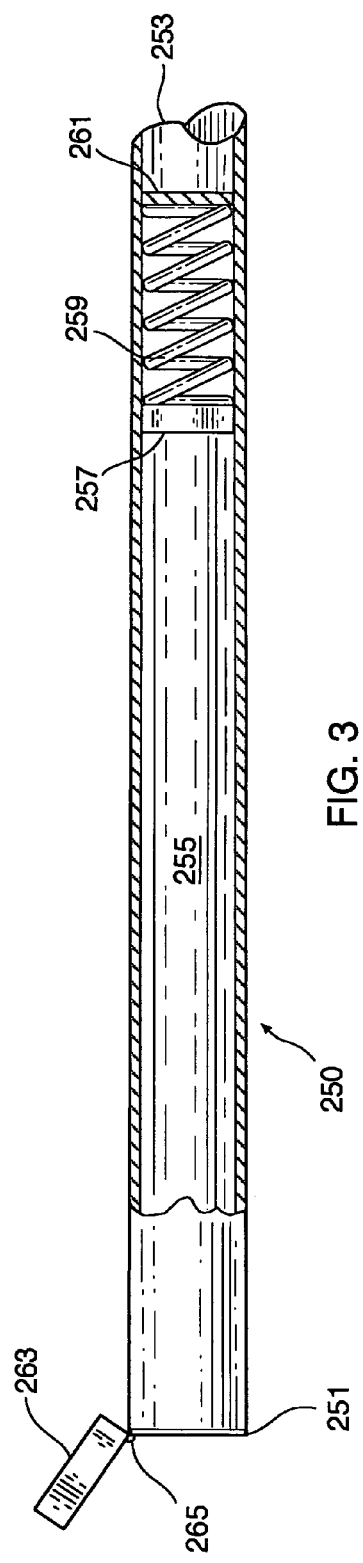
FIG. 3 shows a side partially cut partial view of a present invention fishing pole with a spring base for spring-loaded storage and spring-ejection release of a collapsed present invention telescopic wading staff.

FIG. 3 shows a side cut, partial view of the proximal end of a present invention fishing pole 250. It has an open end 251 and a hollow chamber 255 for insertion and storage of a retracted present invention telescopic staff component. In this embodiment, a cap 263 is an element of the pole instead of the staff as shown in FIG. 1. Cap 263 may be a hinge cap, a screw cap or any type, such as those described above. Merely for illustration purposes, it is a friction lock flip cap with hinge 265 that has significant friction locking strength.

Additionally, a spring-biased push plate 257 with soft spring 259 receives an end of a staff and is pushed further into the chamber 255 towards stop 261. Push plate 257 will maintain pressure on a stored staff so that when cap 263 is opened, the staff will be partially pushed out for easy grasping and subsequent use.

Figure 4:
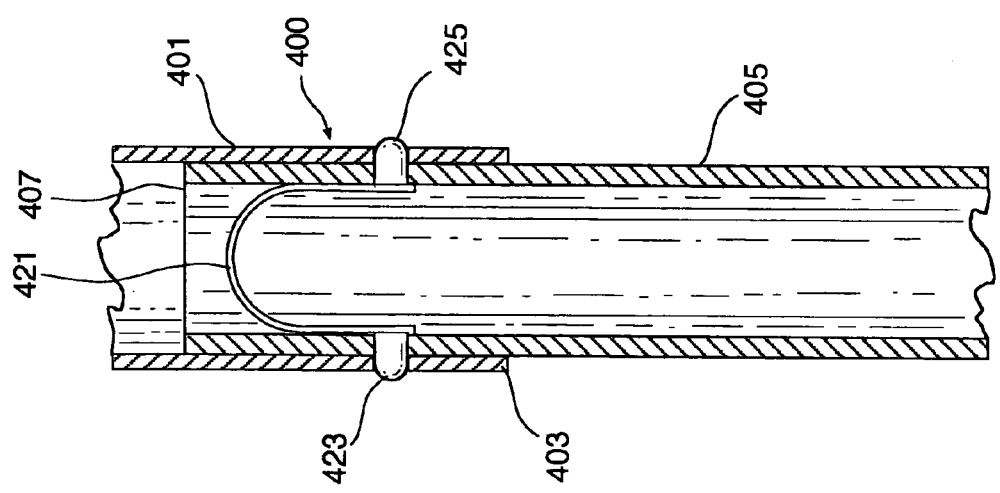
FIG. 4 shows a front cut view of partial sections of interlocking wading staff segments showing details of the locking mechanism.

FIG. 4 shows a front cut partial view of two segments of a present invention component staff 400. Wading staff 400 has two segments 401 and 405 and they are telescopically interconnected, Bottom end 403 of segment 401 receives and holds top end 407 of segment 405, and the two segments are slidable relative to one another. Locking means in this embodiment involve orifices and buttons, and, more specifically, inverted "U" spring 421 has ears, i.e., buttons 423 and 425 that may be pushed in to disengage and snap-in release to engage the locking orifices.

Figure 5:
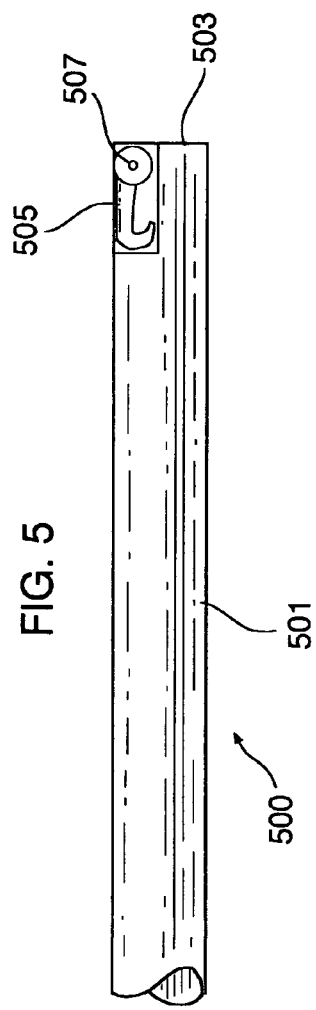
FIGS. 5 and 6 show side views of a bottom portion of a present invention wading staff having a jack knife movement type end hook.
Figure 6:
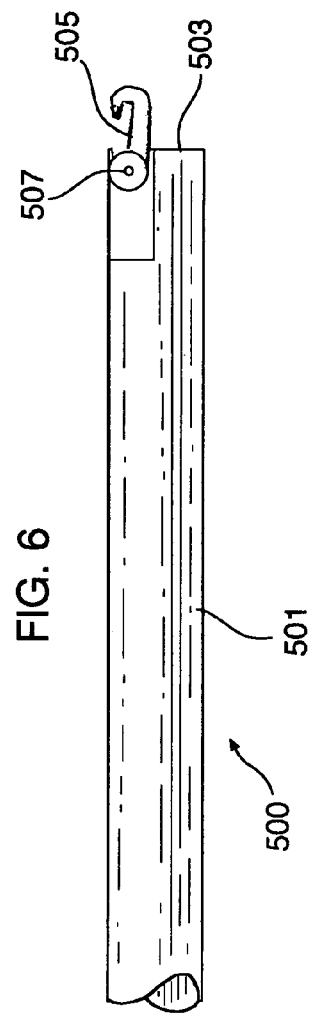

FIGS. 5 and 6 show side views of a bottom portion of a present invention wading staff 500 end segment 501, having a jack knife movement type end hook 505. Hook 505 in FIG. 5 is in its stored position adjacent bottom end 503. It has a pivot pin 507. As shown in FIG. 6, it may be swung out to end beyond bottom end 503 to be used as a hook for one or more of the purposes elaborated upon above.

Obviously, numerous modifications and variations of the present invention are possible in light of the above teachings. It is therefore understood that within the scope of the appended claims, the invention may be practiced otherwise than as specifically described herein.

What is claimed is:

1. A fishing pole in combination with a separate telescopic wading staff, which comprises:

(a.) a fishing pole having a proximal end, said proximal end including a handle, and having a distal end with at least one eyelet for guiding a fishing line therethrough, said proximal end both having an opening and a hollow portion extending from said opening and being adapted to receive a separate telescopic wading staff for storage of said wading staff therein, and an inner surface defining said hollow portion of said proximal end having inwardly facing threads thereon;

(b.) said separate telescopic wading staff having a top end and a bottom end, said separate telescopic wading staff having a plurality of interconnected elongated segments including at least two interconnected elongated segments that are telescopically moveable relative to one another with a first, fully compacted configuration, and a second, fully extended configuration, said staff including locking means for at least locking said plurality of interconnected elongated segments in its second configuration, and said top end having an outer surface with outwardly facing threads thereon complementary to and engageable with said inwardly facing threads; and wherein when said separate telescopic wading staff is stored in said proximal end of said fishing pole in its fully compacted configuration, the inwardly facing threads threadably engage said outwardly facing threads to retain and store said staff in said proximal end, and when said separate telescopic wading staff is subsequently removed therefrom and opened to its fully extended configuration, said separate telescopic wading staff can be used as a wading staff.

2. The combination of claim 1 wherein said plurality of interconnected elongated segments includes at least three segments.

3. The combination of claim 1 wherein said telescopic wading staff includes a handle.

4. The combination of claim 1 wherein said telescopic wading staff is made of materials that include at least one material selected from the group consisting of carbon fiber, fiberglass, plastic, metal and natural material.

5. The combination of claim 1 wherein said telescopic wading staff locking means is selected from the group consisting of spring-loaded pin and orifice, spring-loaded ball and orifice, threaded locking ring, and force-fit interlocking ends.

6. The combination of claim 5 wherein said telescopic wading staff includes an alignment mark on each of said segments to align said locking means.

7. A fishing pole in combination with a separate telescopic wading staff, which comprises:
(a.) a fishing pole having a proximal end, said proximal end including a handle, and having a distal end with at least one eyelet for guiding a fishing line therethrough, said proximal end both having an opening and a hollow portion extending from said opening and being adapted to receive a separate telescopic wading staff for storage of said staff therein, and an inner surface defining said hollow portion of said proximal end having inwardly facing threads thereon;
(b.) said separate telescopic wading staff having a top end and a bottom end, said separate telescopic wading staff having a plurality of interconnected elongated segments including at least two interconnected elongated segments that are telescopically moveable relative to one another with a first, fully compacted configuration, and a second, fully extended configuration, said staff including locking means for at least locking said plurality of interconnected elongated segments in its second configuration, said top end having an outer surface with outwardly facing threads thereon complementary to and engageable with said inwardly facing threads, and said telescopic wading staff having a hook located proximate said bottom end thereof; and wherein when said separate telescopic wading staff is stored in said proximal end of said fishing pole in its fully compacted configuration, the inwardly facing threads threadably engage said outwardly facing threads to retain and store said staff in said proximal end, and when said separate telescopic wading staff is subsequently be removed therefrom and opened to its fully extended configuration, said separate telescopic wading staff can be used as a wading staff.

8. The combination of claim 7 wherein said plurality of interconnected elongated segments includes at least three segments.

9. The combination of claim 7 wherein said telescopic wading staff includes a handle.

10. The combination of claim 7 wherein said telescopic wading staff is made of materials that include at least one material selected from the group consisting of carbon fiber, fiberglass, plastic, metal and natural material.

11. The combination of claim 7 wherein said telescopic wading staff locking means is selected from the group consisting of spring-loaded pin and orifice, spring-loaded ball and orifice, threaded locking ring and force-fit interlocking ends.

12. The combination telescopic wading staff and fishing pole of claim 11 wherein said telescopic wading staff includes an alignment mark on each of said segments to align said locking means.

\* \* \* \* \*